Nov. 22, 1932.  T. A. DICKS  1,888,493
PROPELLER HUB
Filed Feb. 1, 1932  2 Sheets-Sheet 1
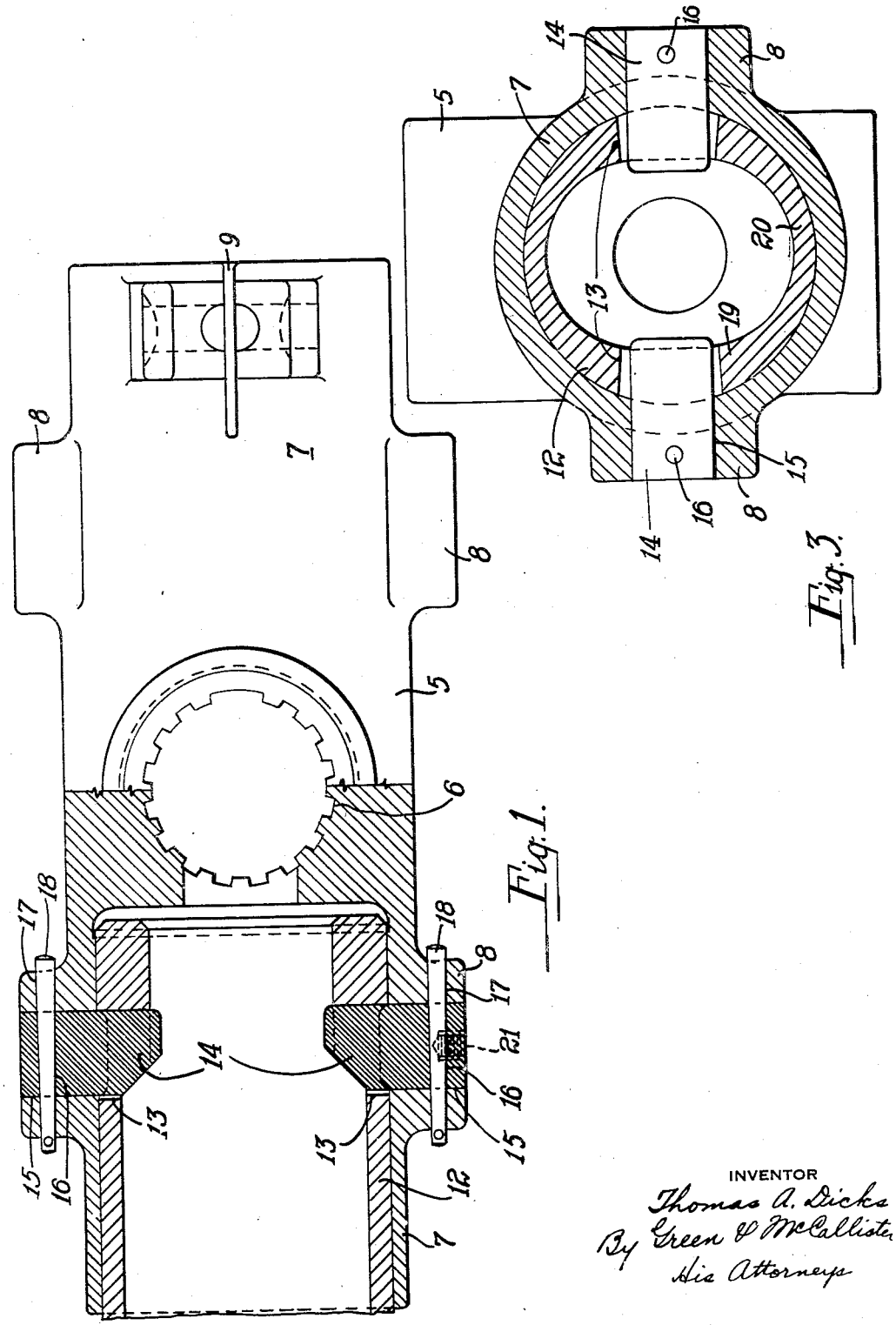
INVENTOR
Thomas A. Dicks
By Green & McCallister
His Attorneys Nov. 22, 1932.  T. A. DICKS  1,888,493
PROPELLER HUB
Filed Feb. 1, 1932  2 Sheets-Sheet 2
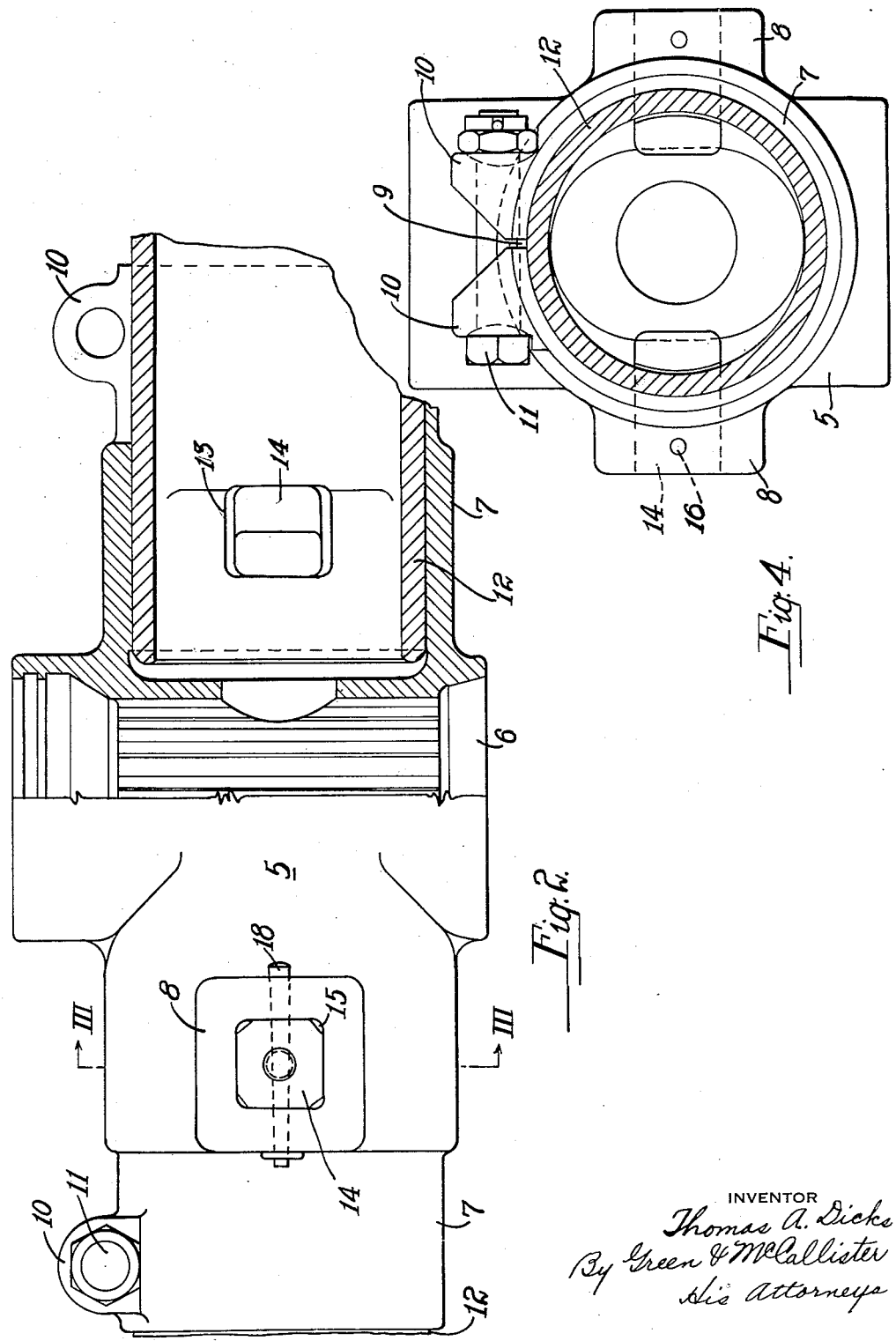

Patented Nov. 22, 1932

1,888,493

UNITED STATES PATENT OFFICE

THOMAS A. DICKS, OF PITTSBURGH, PENNSYLVANIA, ASSIGNOR TO PITTSBURGH SCREW AND BOLT CORPORATION, A CORPORATION OF PENNSYLVANIA

PROPELLER HUB

Application filed February 1, 1932. Serial No. 590,094.

This invention relates in general to aircraft propellers in which the blades are detachably and adjustably mounted in a hub, and in particular to novel means for securing the blade ends to the hub.

In propellers of this general type the blades are usually secured to the hub in one of three ways, first, through a series of interlocking shoulders formed on the end of the blade and on sockets extending radially from the hub, second, by a threaded connection between the propeller blade end and the socket, and third, by a cross-bolt or pin extending through diametrically opposed registering openings formed in the blades and in the sockets. This latter construction, while it has proven successful and is being used extensively at the present time, has, however, certain objectionable features, first, a high degree of care and skill must be used in the machining of the hub since the openings formed on one side of the socket must be in alignment with the openings formed on the opposite side of the socket to permit the insertion of the crossbolt or pin and to prevent an uneven pull being exerted on the cross-bolt when the propeller is rotating. Second, the bearing or shear surface between the blade end and the socket depends directly on the size of the cross-bolt employed and since the shearing stress is on those portions of the bolt between the blade and socket, it is obvious that the central portion of the cross-bolt merely adds to the weight of the propeller and does not perform any useful function. It is therefore, impossible to secure a large bearing surface without materially increasing the weight of the propeller. Third, difficulty has been encountered in removing the blades from the sockets, due to the fact that the central portion of the cross-bolt sometimes becomes so bowed or bent during rotation of the propeller that it is impossible to withdraw the cross-bolt and makes it necessary to cut or drill away the bolt in order to remove the blade.

The principal object of this invention is to provide means for detachably securing a hollow propeller blade end to a hub whereby a greater shearing surface will be obtained without increasing the weight of the propeller.

Another object is to provide a plurality of readily removable shear pins for connecting a blade end to a hub whereby a more solid connection is obtainable between the blade and the hub than is possible when a through cross-bolt is employed.

A further object is to provide a propeller hub having apertured lugs projecting from opposite sides of the sockets through which separable means are extended for securing the blade to the socket and to which the securing means are fastened.

A still further object is to provide a hub of simple construction which is relatively easy to manufacture and is much cheaper in cost than the relatively complex hubs now in use.

A still further object is to provide a blade having the shank thereof upset to reinforce and strengthen the connection between the hub and the blade.

These and other objects which are readily apparent to those skilled in this particular art are obtained by means of this invention, one embodiment of which is described in the following specification and illustrated in the accompanying drawings wherein:

Figure 1 is a view in front elevation partially in section of a hub having propeller blade ends inserted in sockets extending therefrom and showing a type of connection embodying this invention, the outer ends of the propeller blades being broken away for convenience of illustration.

Fig. 2 is a top plan view partially in section of the hub and propeller blade ends.

Fig. 3 is a view in section taken on line III—III of Fig. 2; and

Fig. 4 is an end view of the hub socket, the hollow propeller blade being shown in section.

In the drawings, while I have shown a propeller construction provided with two diametrically opposite blades it is to be understood that this number of blades may be increased to any desired extent without departing from my invention, so long as the individual construction of the hub socket and the connection between the blade and the socket is employed.

Referring in detail to the drawings, 5 designates a hub provided with a transverse axial sleeve 6 into which a driveshaft (not shown) is adapted to be secured in any appropriate and well known manner. Integrally formed with the hub 5 and extending radially therefrom are socket members 7 each of which is provided with relatively thickened portions or lugs 8 adjacent its point of connection to the hub and on diametrically opposite sides thereof, and has the outer end split longitudinally as at 9 and provided with outwardly extending ears 10 on each side of the split 9. These ears 10 are suitably apertured for the reception of a cross bolt 11, the purpose of which will be hereinafter described.

The propeller blade illustrated is of hollow tubular construction and its inner end or shank 12 is adapted to be inserted or telescope within the socket 7 on the hub portion 5. The inner end or shank 12 of each of the blades is apertured as at 13 on diametrically opposite sides thereof.

The blade ends are secured in the sockets 7 by shear pins 14 which are inserted through apertures 15 formed in the lugs 8 and which register with the apertures 13 formed in the shank 12 of the blade. These shear pins 14 are of substantially the same length as the thickness of the wall of the socket 7 and the wall of the blade end and when in place extend slightly beyond the inner wall of the blade end. In the drawings, the shear pins 14 are shown as substantially square in section, but it is to be understood that any other type or shape of shear pin may be employed. To prevent the shear pins 14 from working out of the registering openings 13 and 15, when the propeller is rotating, the outer end of each of the shear pins is provided with an opening 16 which, when the pin is in place, registers with tapered openings 17 formed in the lugs 8, through which a tapered pin 18 is inserted. The tapered pin 18 may be locked in place by a cotter pin or other suitable fastening means inserted through an opening in the small end thereof.

It will be observed that the wall of the tubular propeller blade is relatively thin and in order to prevent blades from breaking or tearing adjacent the shear pins, I prefer to reinforce or strengthen the end of the blade adjacent the points where it is apertured. This may be readily accomplished by upsetting the end of the blade so as to form a thickened portion 19 around the bottom of the blade (Fig. 3). To decrease the weight of the blade, the upset portions of the shank between the apertures 13 may be milled away as at 20 so that these portions of the shank will be of substantially the same thickness as the walls of the blade above the shear pins.

In order to permit the pitch of the blades to be readily adjusted, the apertures 13 in the blade are made somewhat larger than the shear pins 14 so as to provide the space necessary or required for adjustment to the exact position. Upon insertion of the tubular end of the blade in the socket, the apertures in the blade are brought into alignment with the apertures in the socket and the shear pins are inserted therethrough. The tapered locking pins are then inserted through the lugs and shear pins and secured in place. Each of the propeller blades is then turned to secure the proper pitch or angle and are then tightly clamped in that adjusted position by the cross-bolt 11 extending through the ears 10 which forces the end of the socket to grip the propeller blade end.

So that the shear pins 14 may be readily removed, one of the pins in each socket may be tapped as at 21 to receive a removing tool. After the tapped shear pin has been removed, the shear pin on the opposite side may be readily forced out by inserting a punch or other suitable tool through the apertures from which the pin has already been removed.

From the foregoing description it is readily apparent that a propeller blade secured in a socket with a series of short shear pins is more solidly held in the socket than a blade fastened with a cross-bolt longer in length than the diameter of the socket, because the short pin may be forced into the apertures, while the longer bolt, since it must extend through the openings on the opposite side of the socket from the entering side cannot be forced but must be somewhat smaller than the size of the apertures so that it can be moved enough to permit the inserted end to be started through apertures on the opposite side of the socket.

It is also apparent that as the short bolts or pins used in my invention may be substantially thicker than a single long through cross-bolt without being as heavy as such a bolt, a greater bearing or shearing surface is obtained by the use of the shorter shear bolts while the weight of the propeller remains substantially the same.

While I have described the preferred form of my invention, I wish it to be understood that certain changes or substitutions may be made therein without departing from the spirit of my invention or the scope of the appended claims.

What I claim as new and desire to secure by Letters Patent is:—

1. In a propeller, a hub, a plurality of radially extending sockets on said hub, apertured lugs projecting from the sides of said sockets, a tubular propeller blade for each of said sockets having portions of the shank of increased thickness and apertured to register with the apertures in said lugs, a shear pin extending through each set of these registering apertures for securing said blades in said sockets, each of said shear pins being of such a length that the inner end thereof terminates substantially flush with the inner surface of those portions of the shank of increased thickness, and means for retaining said shear pins in said apertures.

2. In a propeller, a hub having a plurality of radially extending sockets, the walls of each of said sockets being provided with oppositely disposed openings, a hollow propeller blade for each of said sockets having openings in the shank registering with the openings in said socket, a shear pin extending through each of said registering openings for locking said blade in said socket, each of said shear pins being substantially square in section, whereby a relatively large shearing surface is provided, each of said pins being of a length sufficient to extend slightly beyond the inner wall of said blade shank, and means for securing said pins to said sockets.

3. In a propeller, a hub, a plurality of sockets extending radially therefrom apertured lugs projecting from the sides of said sockets adjacent the inner ends thereof, a tubular blade for each of said sockets having openings in the shank adapted to register with the openings in the socket, means inserted through each set of these registering openings for holding the blade in the socket and for establishing a relatively large shearing surface between the blade and the socket, each of said blades retaining means being of a length sufficient to extend slightly beyond the inner wall of the shank of the blade, and means for securing said retaining means to said plugs.

4. In a propeller, a hub provided with a series of radially extending sockets each having oppositely disposed apertured lugs projecting therefrom, a hollow propeller blade for each of said sockets having apertures in the shank registering with the apertures in said socket, a shear pin substantially square in section extending through each set of the registering openings to provide an increased shearing surface between the socket and the shank of the blade, and a locking pin extending through each of said shear pins and lugs for locking said shear pins in said openings.

5. A hollow propeller blade having the end thereof upset to form a relatively thick walled shank portion on said blade provided with apertures in the shank above the thick wall portion.

6. In a propeller, a hub, a series of radially extending sockets formed integrally with said hub and each having apertured lugs projecting from opposite sides thereof, a hollow propeller blade for each of said sockets having the shank end upset to provide a relatively thick wall and provided with apertures adapted to register with the apertures in said sockets, a pin substantially square in section extending through each set of registering apertures in said sockets and blade ends for securing said blades in said sockets, said pins being of a length substantially the same as the combined thickness of the walls of the socket and blade to provide an unimpeded opening longitudinally of the blade, and means for securing said blade retaining pins to said lugs.

In testimony whereof, I have hereunto subscribed my name this 29th day of January, 1932.

THOMAS A. DICKS.